United States Patent [19]
Ohta

[11] 3,937,906
[45] Feb. 10, 1976

[54] TELEPHONE HOOK SWITCH COMPRISING SEPARATELY OPERABLE CONTACT GROUPS

[75] Inventor: Keizou Ohta, Tokyo, Japan

[73] Assignee: Nippon Electric Company, Limited, Tokyo, Japan

[22] Filed: Jan. 31, 1974

[21] Appl. No.: 438,337

[30]  Foreign Application Priority Data
Feb. 7, 1973  Japan.............................. 48-16038

[52] U.S. Cl. .............................................. 179/164
[51] Int. Cl.²......................................... H04M 1/08
[58] Field of Search ..................................... 179/164

[56]  References Cited
UNITED STATES PATENTS
3,027,432   3/1962   Jordan et al. ...................... 179/164

Primary Examiner—William C. Cooper
Attorney, Agent, or Firm—Ostrolenk, Faber, Gerb & Soffen

[57]  ABSTRACT

A telephone hook switch is manufactured by first molding a moldable insulating material into two block portions and an integral bridge. The block portions have a common back surface, adjacent parallel side surfaces having opposed and aligned back edges interconnected by the bridge, a pair of pivot members aligned on a plane perpendicular to the side surfaces and equally spaced therefrom, and slots formed in the respective block portions parallel to the side surfaces and spaced from the pivot members. The bridge has a thin portion bisecting the distance between the side surfaces. Contact members of the switch are snugly placed in predetermined ones of the slots and one of the block portions is folded at the thin portion of the bridge towards the other with the back surfaces of the respective block portions brought into substantial contact with each other. A lever member of the switch is mounted on the pivot members.

6 Claims, 12 Drawing Figures

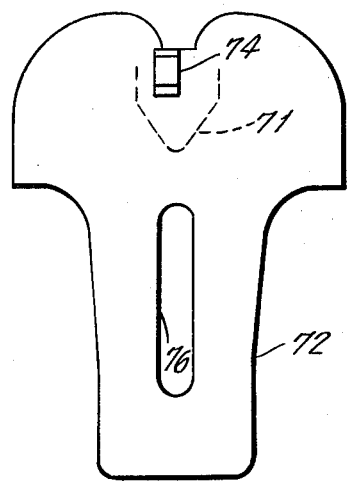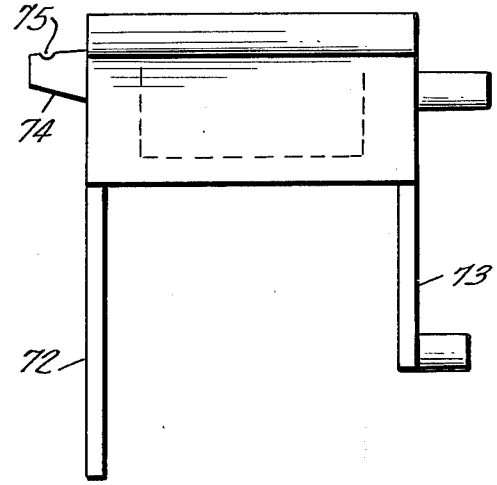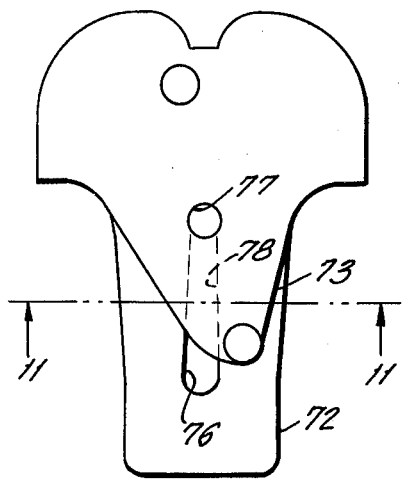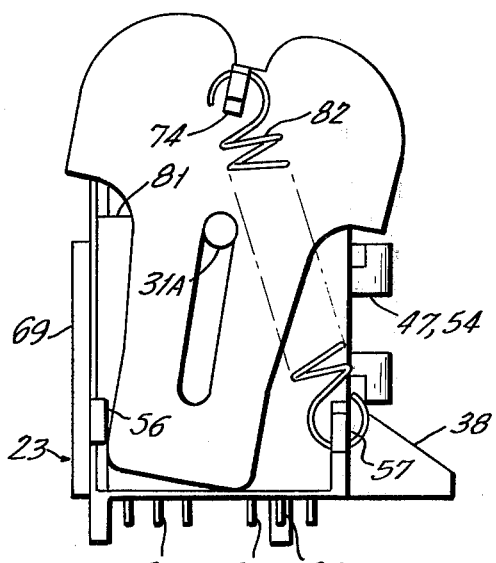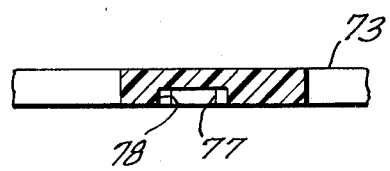

TELEPHONE HOOK SWITCH COMPRISING SEPARATELY OPERABLE CONTACT GROUPS

BACKGROUND OF THE INVENTION

This invention relates to a hook switch operable by a handset of a telephone substation, such as a subscriber's telephone or a branch exchange.

A conventional hook switch comprises a frame member, a plurality of contact members mounted on the frame member with small insulating plates interposed therebetween, a card of an insulating material for uniting predetermined ones of the contact members, and a lever member operable by a handset associated with the hook switch for moving the card to make and break contacts afforded by the contact members in compliance with the on-hook and off-hook positions. Inasmuch as a hook switch of the conventional type is manufactured by successively stacking the insulating plates and the contact members of different shapes on the frame member, the assembly process is confusing and often results in wrong assembly. The work of uniting the predetermined contact members with the card is troublesome and liable to cause damages to the contact members. Inasmuch as the predetermined contact members are simultaneously moved by the card, the resiliency of the predetermined contact members counteracts the movement of the lever member to impose a considerable load on operation of the lever member when the number of the contact members is large. In addition, soldering is necessary to operatively connect the hook switch to other circuits of the telephone substation concerned.

SUMMARY OF THE INVENTION

It is therefore an object of the present invention to provide a telephone hook switch that is easy to assemble.

It is another object of this invention to provide a telephone hook switch wherein improper assembly rarely occurs during manufacture.

It is still another object of this invention to provide a telephone hook switch wherein no card of an insulating material is used to unite predetermined ones of the contact members of the switch.

It is a further object of this invention to provide a telephone hook switch wherein the load imposed on the lever member of the switch is reduced as compared with that imposed on the lever member of a conventional hook switch.

It is a still further object of this invention to provide a telephone hook switch for which soldering of the contact members to other circuits of the telephone substation concerned is unnecessary.

In the manner known in the art, a telephone hook switch according to this invention comprises a plurality of contact members and a lever member for positively moving predetermined ones of the contact members to make and break contacts afforded by the contact members. In accordance with this invention, a frame member for supporting the contact members and for pivotal mounting thereon of the lever member comprises a pair of pivot members placed along an axis of the assembled hook switch pivotally mounting of the lever member and means for supporting the contact members on both sides of the axis. It is therefore possible by operation of the lever member to move predetermined ones of the contact members disposed on one side of the axis against their resiliency and move predetermined ones of the contact members disposed on the other side by the resiliency of such contact members as they opened by the lever member operation. In this connection, it should be noted that the expression "positively" not only means the movement of the contact members against their resiliency but also the movement of the contact members by their resiliency.

According to this invention, there is also provided a block member for use in manufacturing a frame member of a telephone hook switch comprising a plurality of contact members supported by the frame member and a lever member pivotally mounted on the frame member for positively moving predetermined ones of the contact members to make and break contacts afforded by the contact members. The block member comprises two block portions and an integral bridge therebetween. The block portions have a common back surface, first side surfaces interconnected at aligned back edges by the bridge and disposed parallel to each other and perpendicular to the back surface, respectively, second side surfaces spaced a predetermined distance from the first side surfaces, respectively, a pair of pivot members aligned on a plane perpendicular to the back and side surfaces and spaced a predetermined amount from the first side surfaces for pivotal mounting thereon of the lever member, respectively, and means extending between the first and second side surfaces of the respective block portions and spaced from the plane for snugly receiving the contact members, wherein the predetermined amount is smaller than the predetermined distance. The bridge has a thin portion of a predetermined thickness extending along a line bisecting the distance between the first side surfaces.

According to this invention, there is further provided a novel method of manufacturing a telephone hook switch comprising a plurality of contact members, a frame member for supporting the contact members, and a lever member pivotally mounted on the frame member for positively moving predetermined ones of the contact members to make and break contacts afforded by the contact members. The method comprises the steps of molding a moldable insulating material into a block member defined in the next preceding paragraph, causing the contact members to be received in the receiving means, folding one of the block portions with the contact members supported thereby at the thin portion on the other of the block portions with the contact members also supported thereby to bring the back surfaces of the both block portions into substantial contact with each other, and mounting the lever means on the pivot members. A hook switch according to this invention is thus easily assembled without the liability of improper assembly.

BRIEF DESCRIPTION OF THE DRAWING:

FIG. 8 is a front view of a lever member of a telephone hook switch according to this invention;

FIG. 9 is a right-hand side view of the lever member;

FIG. 10 is a back view of the lever member;

FIG. 11 is a partial cross-sectional view of the lever member taken on line 11—11 of FIG. 10; and FIG. 12 is a schematic front view of a telephone hook switch according to this invention.

Figure 2:
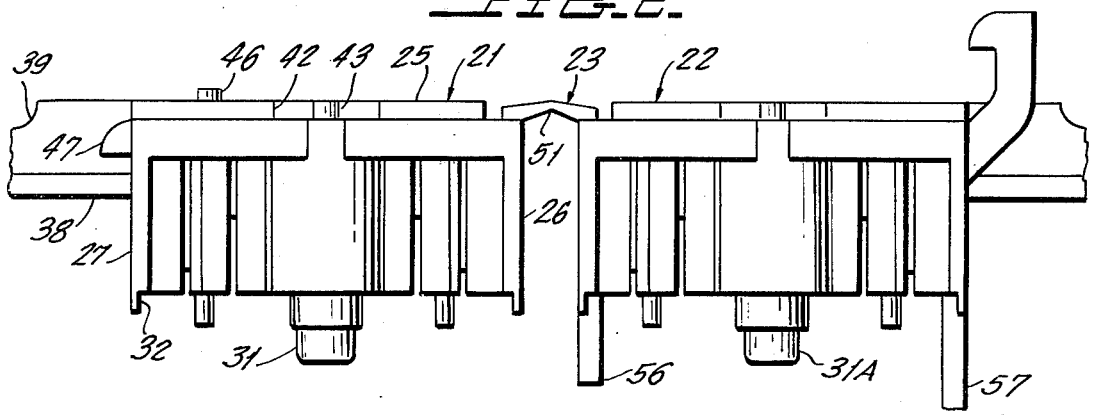
FIG. 2 is a top view of the block member.
Figure 1:
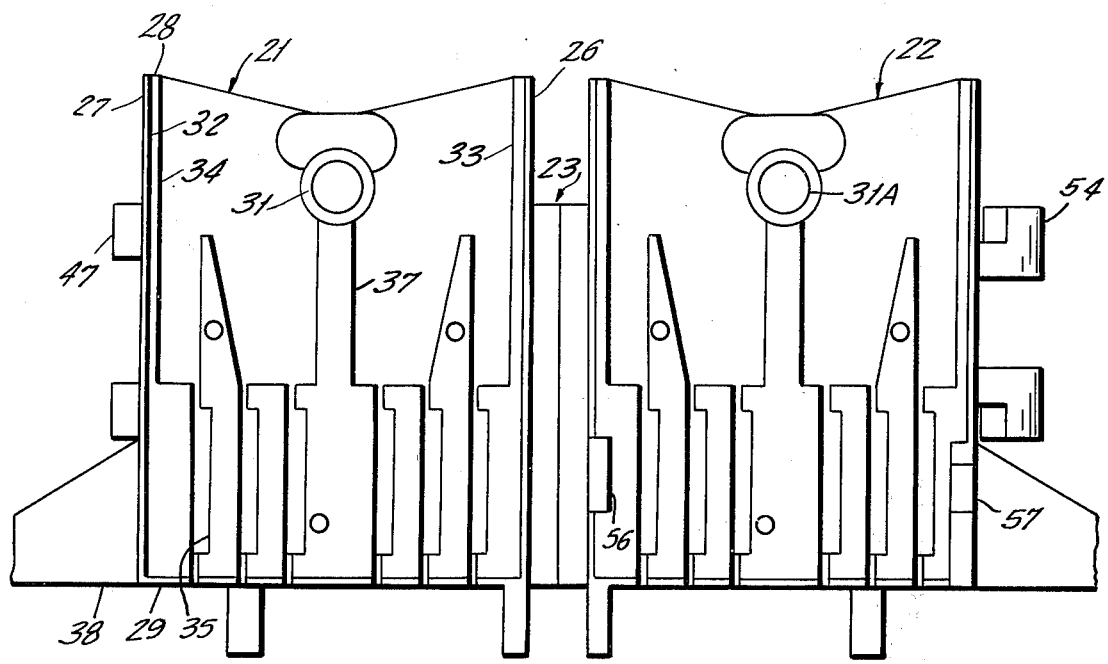
FIG. 1 is a front view of a block member for use in manufacturing a frame member of a telephone hook switch in accordance with the instant invention.
Figure 3:
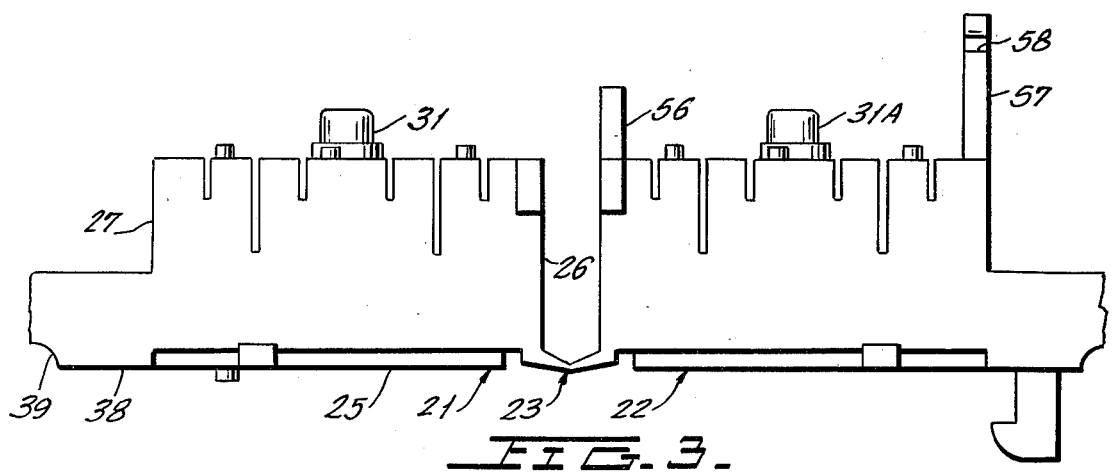
FIG. 3 is a bottom view of the block member.
Figure 4:
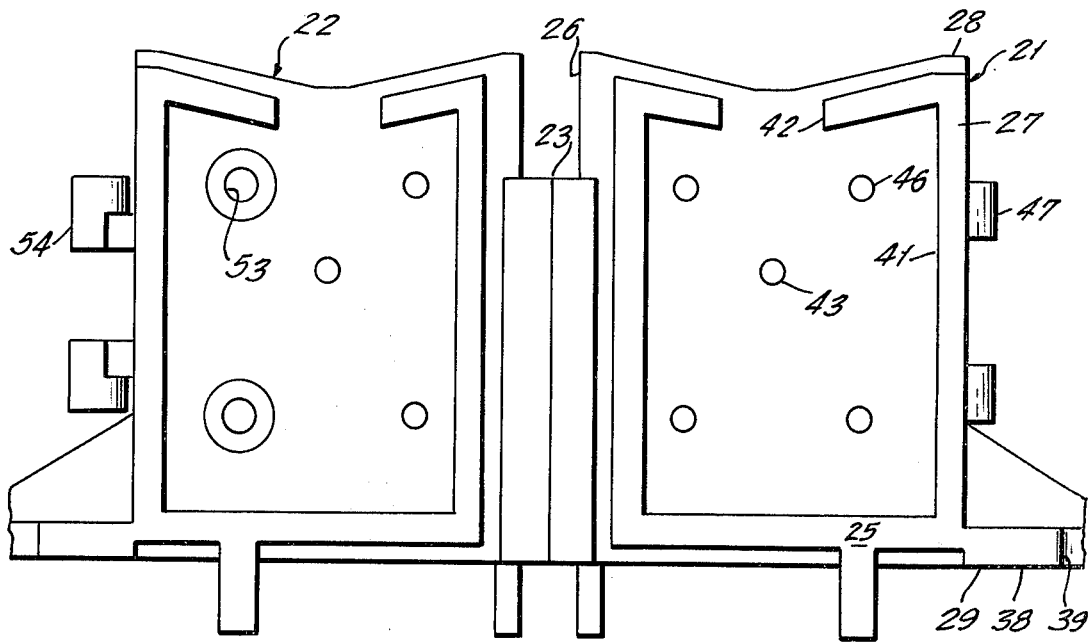
FIG. 4 is a back view of the block member.

DESCRIPTION OF THE PREFERRED EMBODIMENTS:

Referring to FIGS. 1 through 4, a block member made of a moldable insulating material for a frame member of a telephone hook switch in accordance with the present invention comprises a first block portion 21, a second block portion 22, and an integral bridge 23 joining block portion 21 and 22. The first block 21 comprises a back surface 25, a first side surface 26 disposed perpendicular to the back surface 25 a bridge 23 attached to back surface 25 at the edge formed with side surface 26, a second side surface 27 spaced a predetermined distance from the first side surface 26, a top or first end surface 28 disposed perpendicular to the back and side surfaces 25, 26, and 27, and a bottom or second end surface 29 disposed parallel to the top surface 28. Thus, the first block portion 21 is of a rectangular parallelopiped shape in outline having a front or principal surface defined by the front edges of the side and end surfaces 26 through 29. The first block portion 21 further comprises a pivot member 31 whose axis is spaced a predetermined distance from the first side surface 26 and a smaller distance from top surface 28 than from the bottom surface 29. The pivot member 31 protrudes axially from the principal surface. The first block portion 21 still further comprises a front indent 32 from the principal surface, a pair of hollow spaces 33 and 34 disposed on the respective sides of the first and second side surfaces 26 and 27 with respect to the axis of the pivot member 31 and opening through the principal surface and through the top surface 28, and a plurality of slots 35 formed into the block portion from the principal surface and extending parallel to the side surfaces 26 and 27 between the hollow spaces 33 and 34 and the bottom surface 29. As best illustrated in FIG. 3, predetermined ones of the slots 35 extend a first predetermined depth from the principal surface into the bottom surface 29 while others similarly extend a second predetermined depth that is smaller than the first predetermined depth. Although the hollow spaces 33 and 34 are separated by a central wall 37 in the example being illustrated, they may communicate with each other. The first block portion 21 further comprises a tab 38 extending sidewards from the second side surface 27 and having a semicircular recess 39 extending inward from the back surface 25, a back indent 41 from the back surface communicating with the top surface 28 at a portion 42, a plurality of bosses 43 extending perpendicular to the back surface 25 in the back indent 41 to reach the back surface 25, a pair of back protrusions 46 similarly extending in the back indent 41 but beyond the back surface 25, and a pair of hook receivers 47 extending sideways from the second side surface 27.

Further referring to FIGS. 1 through 4, the bridge 23 has a thin portion 51 of a predetermined thickness extending parallel to the first side surface 26 of the first block portion 21. The back surface of the thin portion 51 is substantially on the same plane as the back surface 25. The second block portion 22 is substantially congruent with the first block portion 21 and disposed symmetrical thereto with respect to the thin portion 51 of the bridge 23. Thus, the thin portion 51 extends along a line bisecting the distance between the first side surface 26 of the first block portion 21 and the corresponding side surface of the second block portion 22. Instead of the protrusions 46 and the hook receivers 47, the second block portion 22 comprises a pair of bosses in the back indent, each having a recess 53 formed into the back surface of the second block portion 22, for receiving the respective back protrusions 46 and a pair of hook members 54 extending sideways from the second side surface and rearwards from the back surface for engagement with the respective hook receivers 47. In the example being illustrated, the second block portion 22 further comprises a first front protrusion 56 extending from and perpendicular to a first side of the principal surface and a second front protrusion 57 similarly extending from another side of the principal surface and having a recess 58.

Figures 5, 6, 7:
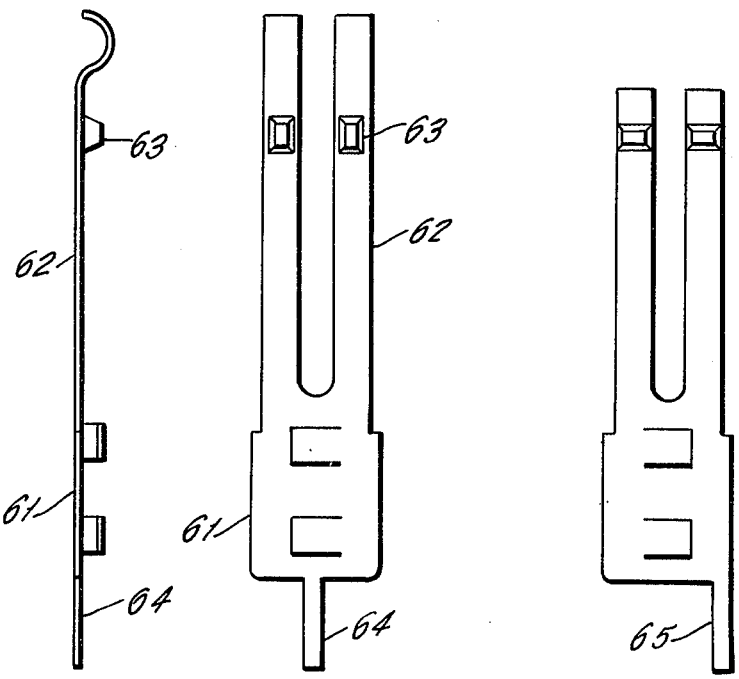
FIG. 5 is a front view of a first contact member of a telephone hook switch according to this invention.
FIG. 6 is a right-hand side view of the first contact member.
FIG. 7 is a similar view of a second contact member of the telephone hook switch according to this invention.

Referring to FIGS. 5 and 6, a first contact member is made of a resilient electrically conductive material, such as phosphor bronze, and comprises a base portion 61 to be inserted in one of the slots 35 and similar slots formed in the first and second block portions 21 and 22, a plurality of fingers 62 extending upwards from the base portion 61 and having contacts 63, and a terminal 64 extending downwards from the base portion 61 to be positioned in the slot 35, terminal 64 extending outward from the bottom surface 29 a predetermined distance.

Referring to FIG. 7, a second contact member is similar to the first contact member except for the length of the fingers, the orientation of the contacts, and a downwardly extending terminal 65 which is adapted for the slot 35 extending into the bottom surface 29 the second predetermined depth. Although not shown, a third contact member is similar to the second contact member except for the surfaces of the fingers on which the contacts are formed.

In the manufacture of a telephone hook switch, first, second, and third contact members are put into predetermined ones of the slots communicating with at least two selected hollow spaces of the first and second block portions 21 and 22. The first contact member is positioned in the slot cut the first predetermined depth into the bottom surface so that the terminal 64 may extend downwardly from the bottom surface as best shown in FIG. 12 and that the fingers 62 may extend upwardly from the top surface. The second or third contact member is positioned in the slot cut the second predetermined depth into the bottom surface so that the terminal, such as 65, may extend downwardly therefrom and that the fingers may not appreciably extend outwardly of the hollow space. One of the block portions 21 and 22 is now folded towards the other about the thin portion 51 of the bridge 23 to bring the back surfaces of the block portions 21 and 22 into substantial contact with each other. The block portions 21 and 22 are locked together by engagement of the hook members 54 with the hook receivers 47 and by fitting of the back protrusions 46 in the indents or recesses 53, with the respective first and second side surfaces of block portions 21 and 22 becoming coextensive. The bridge 23 becomes ridges illustrated in FIG. 12 at 69. The pivot members, such as 31 and 31A, are now aligned along a common axis, with their axially outward ends axially protruding from the principal surfaces of the block portions 21 and 22 and spaced a preselected distance. It is to be noted that the contact members are now disposed on both sides of the common axis and, as the case may often be, further on both sides of the back surfaces which are now a common plane bisecting the common axis. Incidentally, the semicircular recesses, such as 39, are now congruent and form a circular hole.

Referring now to FIGS. 8 through 11, a lever member made of a moldable insulating material for use in a telephone hook switch in accordance with the present invention comprises a ridge 71, a first arm 72 extending from one of the substantial ends of the ridge 71 in a direction perpendicular thereto, a second arm 73 similarly extending from the other of the substantial ends, and a protrusion 74 having a recess 75 and protruding from the first arm 72 parallel to the ridge 71. The outer surfaces of the arms 72 and 73 are spaced a preselected amount smaller than the preselected distance of the axially outward ends of the pivot members, such as 31. The inward surfaces of the arms 72 and 73 are spaced an appreciable amount larger than the distance between the first and second side surfaces of the blocks 21 and 22. The first arm 72 is longer than the second arm 73 and has an elongated hole 76 extending in the direction of the arm 72. The second arm 73 has a circular hole 77 and an inwardly directed groove 78 on the surface facing the first arm 72 and extending from the hole 77 to the end of the arm 73. It is to be noted that the holes 76 and 77 are for receiving the pivot members.

Referring finally to FIG. 12, a telephone hook switch according to this invention is assembled by putting a pair of plates 81 in the front indents, such as 32, of the block portions 21 and 22 and placing the lever member on the frame member assembly so that the ridge 71 may be situated between the first contact members supported by the frame member on both sides of the axis of pivotal movement of the lever member so that the elongated and circular holes 76 and 77 receive the respective pivot members 31 and 31A. The inwardly directed groove 78 facilitates mounting of the lever member on the frame member assembly. Subsequently, a tension coil spring 82 is extended between the recess 75 in the protrusion 74 of the lever member and the recess 58 in the second protrusion 57 of the second block portion 22 to bias the lever member with respect to the frame member assembly. The first and second protrusions 56 and 57 limit the pivotal movement of the lever member. On placing a telephone hook switch according to this invention in a telephone substation, the terminals of the contact members may be brought into engagement with a circuit board situated in the substation. The lever member may be rocked by a handset at bosses formed on the second arm 73 as best shown in FIG. 9.

The present invention has been described with respect to a preferred embodiment thereof; many variations and modifications will now become apparent to one skilled in the art. Therefore, I do not prefer to be limited by the examples herein, but only by the appended claims.

What is claimed is:

1. In a telephone hook switch including a plurality of contact members, a frame member having a pair of axially aligned pivot members outwardly extended from said frame member and having means for supporting said contact members enclosed within said frame member and positioned on both sides of said pivot members common axis, and a lever member pivotally mounted on said pivot members for positively moving predetermined ones of said contact members into and out of contact with predetermined other ones of said contact members, the improvement wherein said frame member comprises two initially non-contacting block portions, each having a back surface, one of said pivot members disposed on each said back surface, a first side surface disposed perpendicular to said back surface on one side of said pivot member axis, and a second side surface spaced a predetermined amount from said first side surface and disposed on the other side of said pivot member axis, the back surfaces of both said block portions being brought into substantial contact with each other with the first and second side surfaces of one of said block portions being coextensive with the respective first and second side surfaces of the other of said block portions.

2. A hook switch as claimed in claim 1, wherein said frame member has a pair of principal surfaces outwardly disposed on both sides of and spaced a predetermined distance from said substantially contacting back surfaces, said pivot members protruding axially from said principal surfaces, a first common end surface disposed perpendicular to said back and side surfaces on one side of said pivot members common axis, and a second common end surface disposed parallel to said first end surface on the other side of said axis; each of said block portions having a pair of hollow spaces disposed between the first and the second side surfaces of the block portion on either side of said axis and opening through the principal surface of the block portion and through said first end surface, a plurality of slots formed through said second end surface into the block portion from the principal surface of the block portion and communicating with said hollow spaces, predetermined ones of said slots extending a first predetermined depth into said second end surface, the remaining ones of said slots extending a second predetermined depth into said second end surface, said contact members being disposed in and supported by said slots and extending into said hollow spaces, said contact members further extending outwardly beyond said second end surface.

3. A hook switch as claimed in claim 2, wherein said pivot members have axially outward ends each spaced a predetermined distance from said back surfaces; said lever member comprises a ridge extending parallel to said axis between the contact members disposed on one side of said axis and the contact members disposed on the other side of said axis and a pair of arms extending from the respective substantial ends of said ridge in a direction perpendicular to said axis and having axially outer surfaces spaced a preselected amount smaller than said predetermined distance, respectively, a first of said arms extending in said direction a first predetermined amount beyond said axis and having a circular hole for receiving one of said pivot members and an inwardly directed groove extending from said hole to the end of said first arm remote from said ridge, a second of said arms extending in said direction a second predetermined amount beyond said axis and having an elongated hole extending in said direction towards the end of said second arm remote from said ridge, said second predetermined amount being greater than said first predetermined amount, the other of said pivot members being received in said elongated hole at its end adjacent to said ridge.

4. A hook switch as claimed in claim 1, wherein said initially non-contacting block portions are united by a thin flexible bridge member extended therebetween and integrally formed on said back surfaces along an edge formed by said back surface and said first side surface of each block portion; and lock means for maintaining said block portions back surfaces in contact.

5. A hook switch as claimed in claim 4, wherein said lock means comprises a hook member extending outwardly beyond the back surface generally parallel to said pivot member common axis and outwardly from the second side surface of one of said block portions; a hook receiver protruding from the second side surface of the other of said block portions for engagement with said hook member; a protrusion extending from the back surface of one of said blocks parallel to said pivot member aligned axis; and an indent recessed into the back surface of the other of said blocks for receiving said protrusion.

6. A block member for a frame member of a telephone hook switch comprising a plurality of contact members supported by said frame member and a lever member pivotally mounted on said frame member for positively moving predetermined ones of said contact members to make and break contacts afforded by said contact members, which comprises two block portions and an integral bridge, said blocks having a common back surface, first side surfaces interconnected by said bridge and disposed parallel to each other and perpendicular to said back surface, second side surfaces spaced a predetermined distance from respective first side surfaces, a pair of pivot members aligned on a plane perpendicular to said back and side surfaces and spaced a predetermined amount from said first side surfaces for pivotal mounting thereon of said lever member, and means extending between said first and second side surfaces of the respective block portions and spaced from said plane for snugly receiving said contact members, said predetermined amount being smaller than said predetermined distance, said bridge having a thin portion of a predetermined thickness extending along a line bisecting the distance between said first side surfaces.

* * * * *